(12) United States Patent
Wu (10) Patent No.: US 11,513,654 B2
(45) Date of Patent: Nov. 29, 2022

(54) ELECTROMAGNETIC HANDWRITING SYSTEM AND ELECTROMAGNETIC HANDWRITING INPUT METHOD

(71) Applicant: Shenzhen Huion Animation Technology Co., Ltd., Shenzhen (CN)

(72) Inventor: Shihua Wu, Shenzhen (CN)

(73) Assignee: SHENZHEN HUION ANIMATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/498,860

(22) Filed: Oct. 12, 2021

(65) Prior Publication Data

US 2022/0164046 A1 May 26, 2022

(30) Foreign Application Priority Data

Nov. 24, 2020 (CN) .......................... 202011328379.0

(51) Int. Cl.
*G06F 3/046* (2006.01)
*G06F 3/041* (2006.01)
*G06F 3/0354* (2013.01)
*G06F 3/038* (2013.01)

(52) U.S. Cl.
CPC .......... *G06F 3/046* (2013.01); *G06F 3/04166* (2019.05); *G06F 3/038* (2013.01); *G06F 3/03545* (2013.01)

(58) Field of Classification Search
CPC .. G06F 3/046; G06F 3/04166; G06F 3/03545; G06F 3/038
See application file for complete search history.

(56) References Cited

U.S. PATENT DOCUMENTS

| | | | |
|---|---|---|---|
| 2012/0068975 A1* | 3/2012 | Wei | G06F 3/046 345/179 |
| 2014/0152627 A1* | 6/2014 | Wong | G06F 3/03545 345/179 |

* cited by examiner

*Primary Examiner* — Lisa S Landis
(74) *Attorney, Agent, or Firm* — IPro, PLLC (57) ABSTRACT

The present disclosure discloses an electromagnetic handwriting system and electromagnetic handwriting input method. An electromagnetic handwriting system includes an electromagnetic handwriting tablet configured to receive a drive signal, the drive signal drives the electromagnetic handwriting tablet to be in a suspension state or an enable state. A frequency value at which the electromagnetic handwriting tablet enters the suspension state is set as a suspension state frequency threshold f0, A frequency value at which the electromagnetic handwriting tablet enters the enable state is set as an enable state frequency threshold f1. If an actual frequency value of the drive signal received by the electromagnetic handwriting tablet is set to ft, and a virtual frequency value fx is set to satisfy $|f0-f1|>|f0-fx|$ and $|f0-f1|>|fx-f1|$, then when ft satisfies $|f0-fx|>|f0-ft|$ and $|f0-fx|>|ft-fx|$, ft is adjusted to fx in response to driving the electromagnetic handwriting tablet.

14 Claims, 8 Drawing Sheets

ELECTROMAGNETIC HANDWRITING SYSTEM AND ELECTROMAGNETIC HANDWRITING INPUT METHOD

FIELD OF THE PRESENT DISCLOSURE

The present disclosure relates to the technical field of computer peripheral devices, and more particular, relates to an electromagnetic handwriting system and an electromagnetic handwriting input method.

DESCRIPTION OF RELATED ART

Electromagnetic handwriting systems are commonly used computer input peripheral devices. An electromagnetic handwriting system typically includes an electromagnetic stylus and an electromagnetic handwriting tablet, operates based on the electromagnetic induction principle, and has merits of high precision, pressure sensing, and the like. The electromagnetic handwriting system is widely applied in the fields of computer-aided drawing, game making, film special effect rendering, electronic endorsing and the like.

When a user writes, signs signature or makes drawings on the electromagnetic handwriting tablet with the electromagnetic stylus, the electromagnetic handwriting tablet captures a movement trajectory and pressure sensing data of the electromagnetic stylus based on the electromagnetic induction principle, and transmits handwriting input data to a computer. The computer receives the handwriting input data, and processes the handwriting input data to generate corresponding texts or graphics and output the same to a display device for display.

In the related art, during use, the electromagnetic stylus emits a drive signal. The electromagnetic handwriting tablet receives the drive signal. The drive signal drives the electromagnetic handwriting tablet to be in a suspension state, an enable state, or a writing state.

A frequency value at which the electromagnetic handwriting tablet enters the suspension state is set as a suspension state frequency threshold $f0$, and a frequency value at which the electromagnetic handwriting tablet enters the enable state is set as an enable state frequency threshold $f1$. A difference $\Delta f=|f1-f0|$ is present between $f0$ and $f1$. An actual frequency value of the drive signal received by the electromagnetic handwriting tablet from the electromagnetic stylus is set to ft, $$ft = \frac{1}{2\pi\sqrt{LC}},$$

and ft is determined by a capacitance value C and an inductance coefficient L of an internal circuit of the electromagnetic stylus. When the user writes on the electromagnetic handwriting tablet with the electromagnetic stylus, a pressure is applied onto the electromagnetic handwriting tablet. The pressure counter-acts on the tip of the electromagnetic stylus. The tip mechanically reciprocates to change the capacitance value C or the inductance coefficient L, such that ft is changed.

The defects in the related art are described herein using the fact that the greater the pressure is, the smaller the inductance coefficient L is, and the greater ft is.

Defect 1: When the electromagnetic stylus is received on the electromagnetic handwriting tablet, a lag is caused during entry into the enable state of the electromagnetic handwriting tablet.

Figure 1:
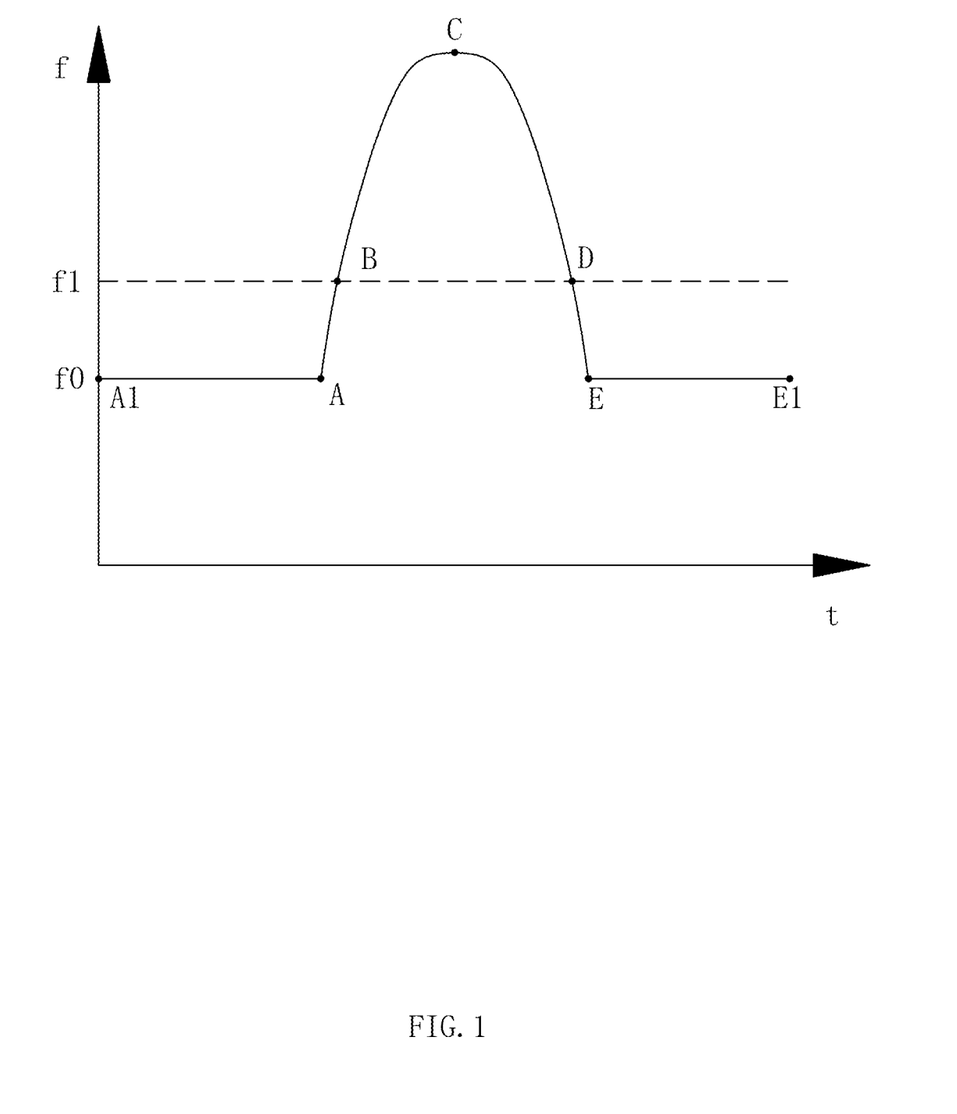
FIG. 1 is a schematic diagram of frequency value change in the prior art.

In the process that the electromagnetic stylus is in suspension and approaching the electromagnetic handwriting tablet, the electromagnetic stylus applies no pressure onto the electromagnetic handwriting tablet, the electromagnetic stylus is in the suspension state, and ft=f0, as illustrated by a straight-line segment A1A in FIG. 1.

When the electromagnetic stylus is in contact with the electromagnetic handwriting tablet, the pressure applied by the user with the electromagnetic stylus onto the electromagnetic handwriting tablet progressively increases from zero, and ft increases accordingly, as illustrated in a curved line segment AC in FIG. 1.

When ft is greater than f0, that is, in the process that ft progressively increases from f0, due to the presence of the difference $\Delta f=|f1-f0|$, as illustrated in a curved line segment AB in FIG. 1, when f0<ft<f1, that is, in the process of switching between the suspension state to the enable state, it is probable that the electromagnetic stylus has been in contact with the electromagnetic handwriting tablet but the stroke lagging appears.

Defect 2: When the electromagnetic stylus leaves from the electromagnetic handwriting tablet, the enable state is interrupted in advance and the stroke disappears.

In the process that the user lifts the electromagnetic stylus away from the electromagnetic handwriting tablet, the pressure applied by the electromagnetic stylus onto the electromagnetic handwriting tablet progressively decreases, and ft decreases accordingly, as illustrated in a curved line segment CE in FIG. 1. In the process that ft progressively decreases to f0, due to the presence of the difference $\Delta f=|f1-f0|$, as illustrated in a curved line segment DE in FIG. 1, when f0<ft<f1, that is, in the process of switching between the enable state and the suspension state, it is probable that the electromagnetic stylus still acts on the electromagnetic handwriting tablet but the electromagnetic stylus is not in the enable state and the stroke disappears in advance.

Therefore, it is desired to provide a method to address the above two defects.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

First Embodiment

Figure 2:
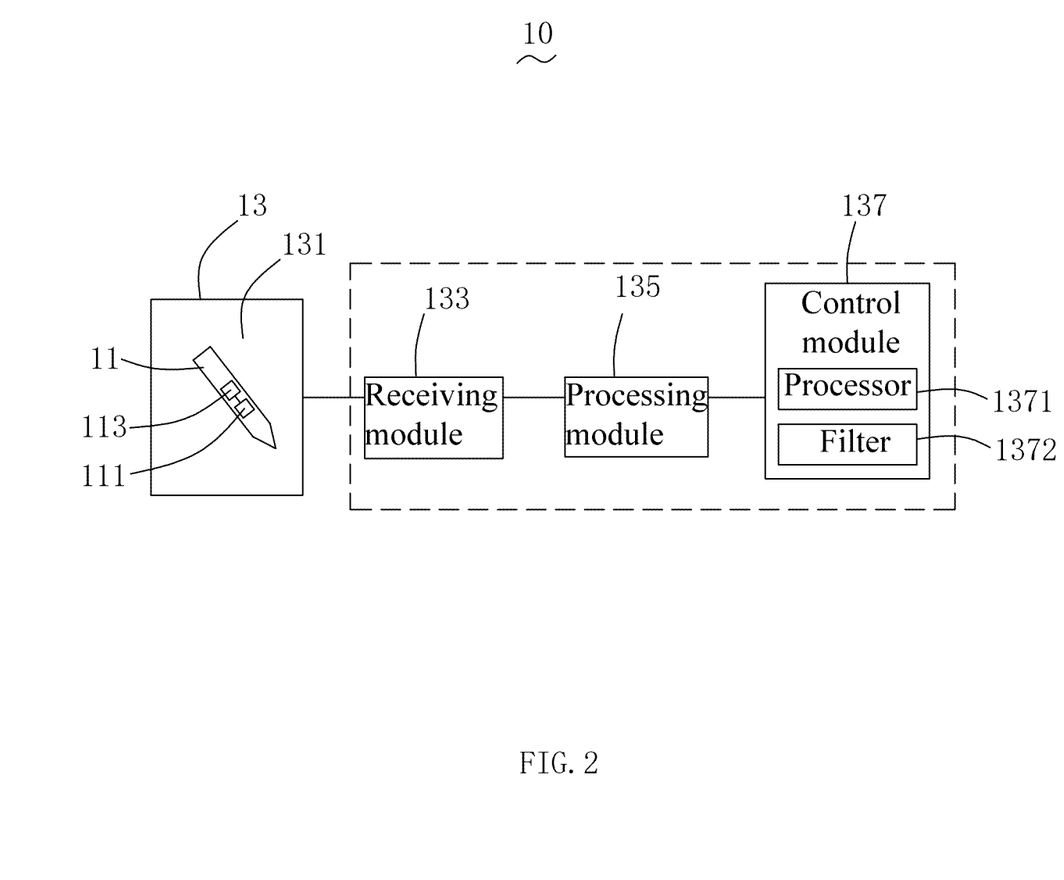
FIG. 2 is a schematic structural view of an electromagnetic handwriting system 10 according to a first embodiment of the present disclosure.
Figure 3:
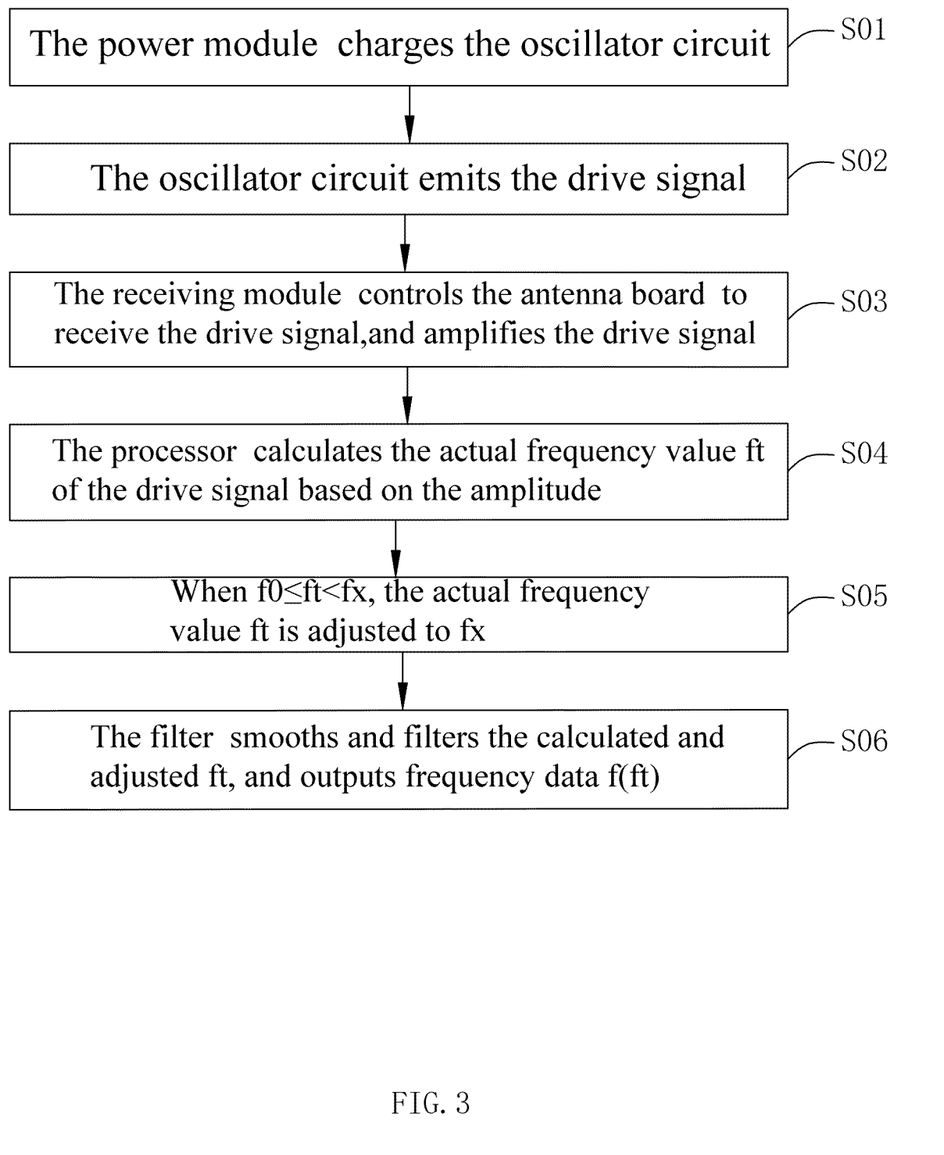
FIG. 3 is a flow block diagram of the electromagnetic handwriting system in FIG. 2.

Referring to FIG. 2 and FIG. 3, FIG. 2 is a schematic structural view of an electromagnetic handwriting system 10 according to a first embodiment of the present disclosure, and FIG. 3 is a flow block diagram of the electromagnetic handwriting system in FIG. 2. The electromagnetic handwriting system 10 includes an electromagnetic stylus 11 and an electromagnetic handwriting tablet 13. The electromagnetic stylus 11 emits a drive signal. The drive signal drives the electromagnetic handwriting tablet 13 to be in a suspension state, an enable state, or a writing state.

In this embodiment, a frequency value at which the electromagnetic handwriting tablet 13 enters the suspension state is set as a suspension state frequency threshold f0, a frequency value at which the electromagnetic handwriting tablet 13 enters the enable state is set as an enable state frequency threshold f1, f1>f0, an actual frequency value of the drive signal received by the electromagnetic handwriting tablet 13 is set to ft, and the electromagnetic handwriting tablet 13 smooths and filters ft to output frequency data f(ft). In this case:

When f(ft)=f0, the electromagnetic handwriting tablet 13 is in the suspension state;

when f0<f(ft)<f1, the electromagnetic handwriting tablet 13 is in a state of switching between the suspension state and the enable state;

when f(ft)=f1, the electromagnetic handwriting tablet 13 is in the enable state; and when f(ft)>f1, the electromagnetic handwriting tablet 13 is in the writing state.

The electromagnetic stylus 11 includes an oscillator circuit 111 and a power module 113. The power module 113 charges the oscillator circuit 111. The oscillator circuit 111 is an LC circuit. The oscillator circuit 111 emits the drive signal according to an operating state of the electromagnetic stylus 11. When the electromagnetic stylus 11 is being used, the actual frequency value ft of the drive signal is changed by changing an inductance coefficient or a capacitance value of the LC circuit. The operating state of the electromagnetic stylus 11 includes a suspension state, an enable state, and a writing state. The suspension state of the electromagnetic stylus 11 corresponds to the suspension state of the electromagnetic handwriting tablet 13. The enable state of the electromagnetic stylus 11 corresponds to the enable state of the electromagnetic handwriting tablet 13. The writing state of the electromagnetic stylus 11 corresponds to the writing state of the electromagnetic handwriting tablet 13. As a pressure applied by the electromagnetic stylus 11 onto the electromagnetic handwriting tablet 13 changes, the electromagnetic stylus 11 switches from the suspension state to the enable state, and correspondingly, the electromagnetic handwriting tablet 13 switches from the suspension state to the enable state.

The electromagnetic handwriting tablet 13 includes an antenna board 131, a receiving module 133, a processing module 135, and a control module 137. The receiving module 133 controls the antenna board 131 to receive the drive signal, and transmits the drive signal to the processing module 135. The processing module 135 outputs an amplitude of the drive signal, and transmits the amplitude to the control module 137. The control module 137 includes a processor 1371 and a filter 1372. The processor 1371 calculates the actual frequency value ft of the drive signal based on the amplitude. The filter 1372 smooths and filters ft.

When the electromagnetic handwriting system 10 operates:

In step S01, the power module 113 charges the oscillator circuit 111.

In step S02, the oscillator circuit 111 emits a drive signal according to the operating state of the electromagnetic stylus 11.

In step S03, under control of the control module 137, the receiving module 133 controls the antenna board 131 to receive the drive signal; and the receiving module 133 processes the drive signal, amplifies the drive signal, and transmits the drive signal to the processing module 135.

In step S04, under control of the control module 137, the processing module 135 processes the drive signal, outputs an amplitude of the drive signal, and transmits the amplitude to the processor 1371.

In step S05, the processor 1371 calculates the actual frequency value ft of the drive signal based on the amplitude. The virtual frequency value fx is set to satisfy f0<fx<f1. When f0≤ft<fx, the actual frequency value ft is adjusted to fx. The processor 1371 transmits the calculated and adjusted ft to the filter 1372.

In step S06, the filter 1372 smooths and filters the calculated and adjusted ft, and outputs frequency data f(ft). When f(ft)=f1, the electromagnetic handwriting tablet enters the enable state.

Figure 4A:
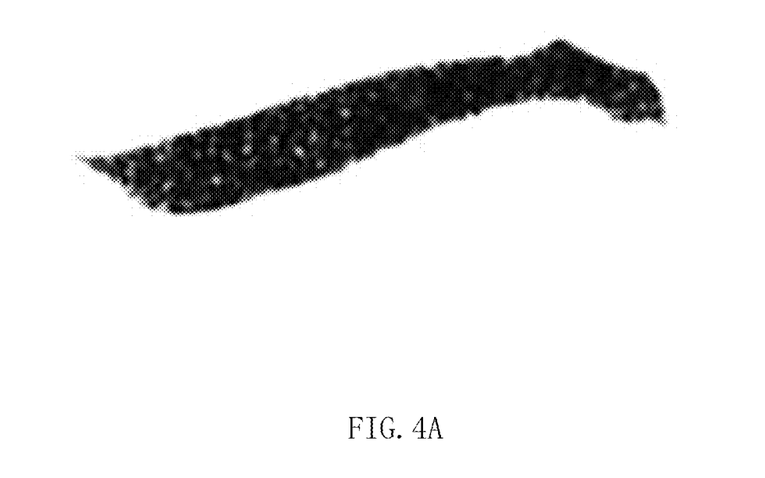
FIG. 4A and FIG. 4B, a writing effect of the electromagnetic handwriting system in FIG. 2 and a writing effect in the related art are respectively illustrated.
Figure 4B:
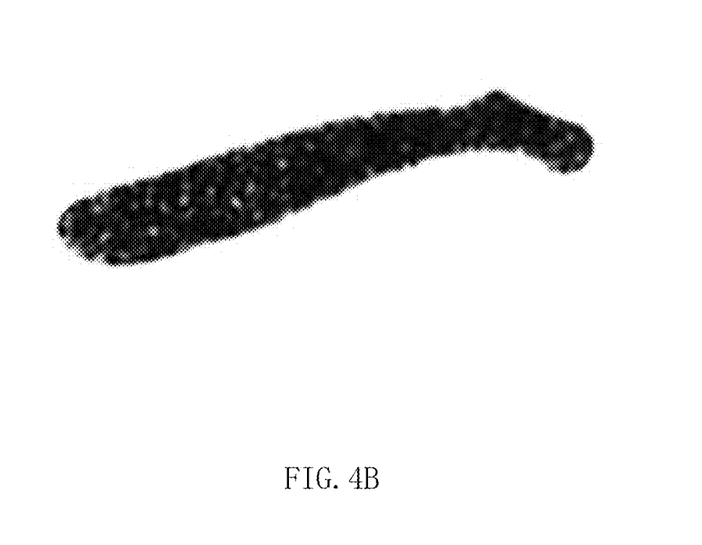

Referring to FIG. 4A and FIG. 4B, a writing effect of the electromagnetic handwriting system in FIG. 2 and a writing effect in the related art are respectively illustrated. As compared with the related art, a user writes with the electromagnetic handwriting system 10, and when the system receives the electromagnetic stylus, the pressure applied by the electromagnetic stylus 11 onto the electromagnetic handwriting tablet 13 progressively increases, the electromagnetic handwriting tablet switches from the suspension state to the enable state, and ft progressively increases from f0. Since when ft<fx, the electromagnetic handwriting tablet adjusts ft to fx, upon smoothing and filtering, when f(ft)=f1, f0<ft<f1, the pressure is not zero, and the electromagnetic handwriting tablet enters the enable state in advance. Therefore, when the electromagnetic stylus is received by the electromagnetic handwriting system, the receiving time is reduced, that is, a switching period of the electromagnetic handwriting tablet 13 from the suspension state to the enable state is shortened, writing flexibility is improved, a lag before entry into the enable state is reduced.

When the electromagnetic stylus leaves from the system, the pressure applied by the electromagnetic stylus onto the electromagnetic handwriting tablet progressively decreases, the electromagnetic handwriting tablet switches from the enable state to the suspension state, and ft progressively decreases to f0. Since when ft<fx, the electromagnetic handwriting tablet adjusts ft to fx, upon smoothing and filtering, when f(ft)=f1, f0<ft<f1, the pressure is not zero, and a lag is caused during entry into the enable state of the electromagnetic handwriting tablet. Therefore, when the electromagnetic stylus leaves from the system, according to the actual handwriting, an effect of gradual fading of the stroke is better exhibited, and the real handwriting is vividly restored.

Second Embodiment

Figure 5:
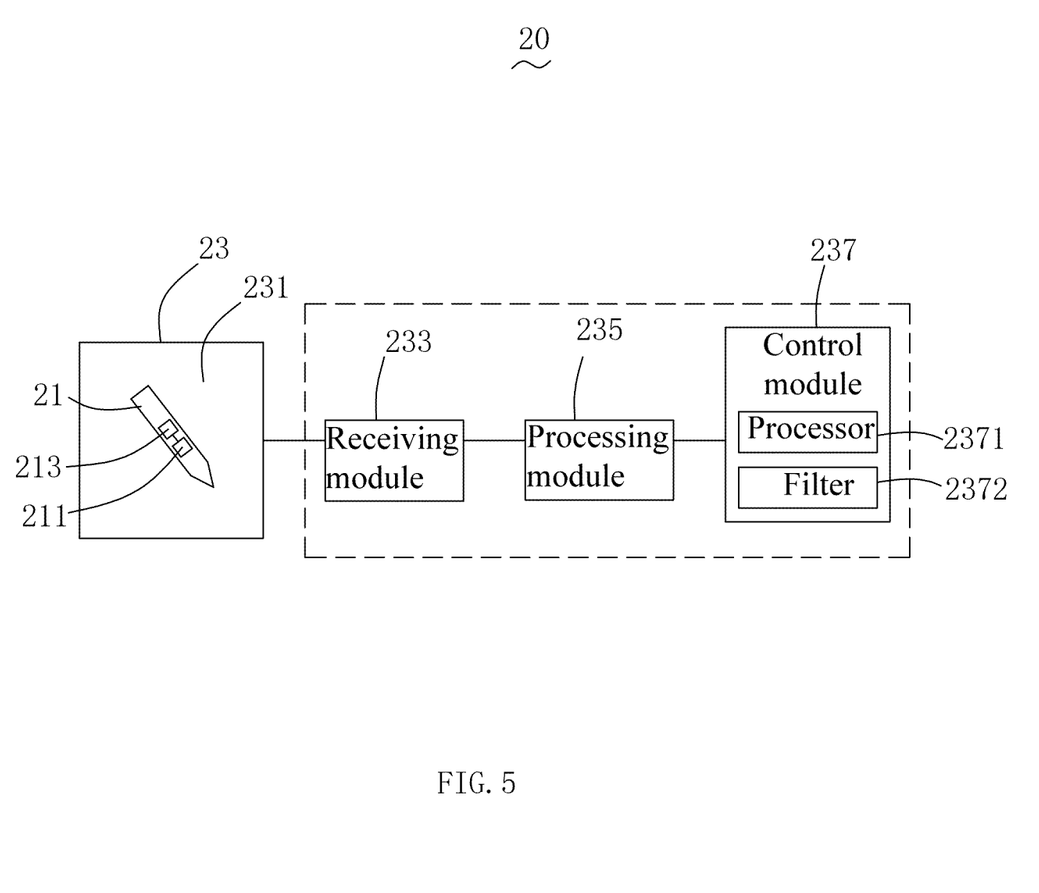
FIG. 5 is a schematic structural diagram of an electromagnetic handwriting system according to a second embodiment of the present disclosure is illustrated.

Referring to FIG. 5, a schematic structural diagram of an electromagnetic handwriting system according to a second embodiment of the present disclosure is illustrated. The electromagnetic handwriting system 20 includes an electromagnetic stylus 21 and an electromagnetic handwriting tablet 23. The electromagnetic stylus 21 emits a drive signal. The drive signal drives the electromagnetic handwriting tablet 23 to be in a suspension state, an enable state, or a writing state.

In this embodiment, a frequency value at which the electromagnetic handwriting tablet 23 enters the suspension state is set as a suspension state frequency threshold f0, a frequency value at which the electromagnetic handwriting tablet 23 enters the enable state is set as an enable state frequency threshold f1, f1<f0, an actual frequency value of the drive signal received by the electromagnetic handwriting tablet 23 is set to ft, and the electromagnetic handwriting tablet 23 smooths and filters ft to output frequency data f(ft). In this case:

When f(ft)=f0, the electromagnetic handwriting tablet 23 is in the suspension state;

when f1<f(ft)<f0, the electromagnetic handwriting tablet 23 is in a state of switching between the suspension state and the enable state;

when f(ft)=f1, the electromagnetic handwriting tablet 23 is in the enable state; and when f(ft)<f1, the electromagnetic handwriting tablet 23 is in the writing state.

The electromagnetic stylus 21 includes an oscillator circuit 211 and a power module 213. The power module 213 charges the oscillator circuit 211. The oscillator circuit 211 is an LC circuit. The oscillator circuit 211 emits the drive signal according to an operating state of the electromagnetic stylus. When the electromagnetic stylus 21 is being used, the actual frequency value ft of the drive signal is changed by changing an inductance coefficient of an inductor or a capacitance value of a capacitor.

The electromagnetic handwriting tablet 23 includes an antenna board 231, a receiving module 233, a processing module 235, and a control module 237. The receiving module 233 controls the antenna board 231 to receive the drive signal, and transmits the drive signal to the processing module 235. The processing module 235 outputs an amplitude of the drive signal, and transmits the amplitude to the control module 237. The control module 237 controls other modules to perform respective operations thereof. The control module 237 includes a processor 2371 and a filter 2372. The processor 2371 calculates the actual frequency value ft of the drive signal based on the amplitude. The filter 2372 smooths and filters ft.

When the electromagnetic handwriting system 20 operates:

The power module 213 charges the oscillator circuit 211. The oscillator circuit 211 emits a drive signal according to the operating state of the electromagnetic stylus 21.

Under control of the control module 237, the receiving module 233 controls the antenna board 231 to receive the drive signal; and the receiving module 233 processes the drive signal, amplifies the drive signal, and transmits the drive signal to the processing module 235.

Under control of the control module 237, the processing module 235 processes the drive signal, outputs an amplitude of the drive signal, and transmits the amplitude to the processor 2371.

The processor 2371 calculates the actual frequency value ft of the drive signal based on the amplitude. The virtual frequency value fx is set to satisfy f0>ft>f1. When f0>ft>fx, the actual frequency value ft is adjusted to fx. The processor 2371 transmits the calculated and adjusted ft to the filter 2372.

The filter 2372 smooths and filters the calculated and adjusted ft, and outputs frequency data f(ft). When f(ft)=f1, the electromagnetic handwriting tablet enters the enable state.

As compared with the related art, a user writes with the electromagnetic handwriting system 20, and when the system receives the electromagnetic stylus, the pressure applied by the electromagnetic stylus 21 onto the electromagnetic handwriting tablet 23 progressively increases, the electromagnetic handwriting tablet switches from the suspension state to the enable state, and ft progressively decreases from f0. Since when f0>ft>fx, the electromagnetic handwriting tablet adjusts ft to fx, upon smoothing and filtering, when f(ft)=f1, f0>ft>f1, the pressure is not zero, and the electromagnetic handwriting tablet enters the enable state in advance. Therefore, when the electromagnetic stylus is received by the electromagnetic handwriting system, the receiving time is reduced.

When the electromagnetic stylus leaves from the system, the pressure applied by the electromagnetic stylus onto the electromagnetic handwriting tablet progressively decreases, the electromagnetic handwriting tablet switches from the enable state to the suspension state, and ft progressively increases to f0. Since when f0>ft>fx, the electromagnetic handwriting tablet adjusts ft to fx, upon smoothing and filtering, when f(ft)=f1, f0<ft<f1, the pressure is not zero, and a lag is caused during entry into the enable state of the electromagnetic handwriting tablet. Therefore, when the electromagnetic stylus leaves from the system, according to the actual handwriting, an effect of gradual fading of the stroke is better exhibited, and the real handwriting is vividly restored.

Third Embodiment

Figure 6:
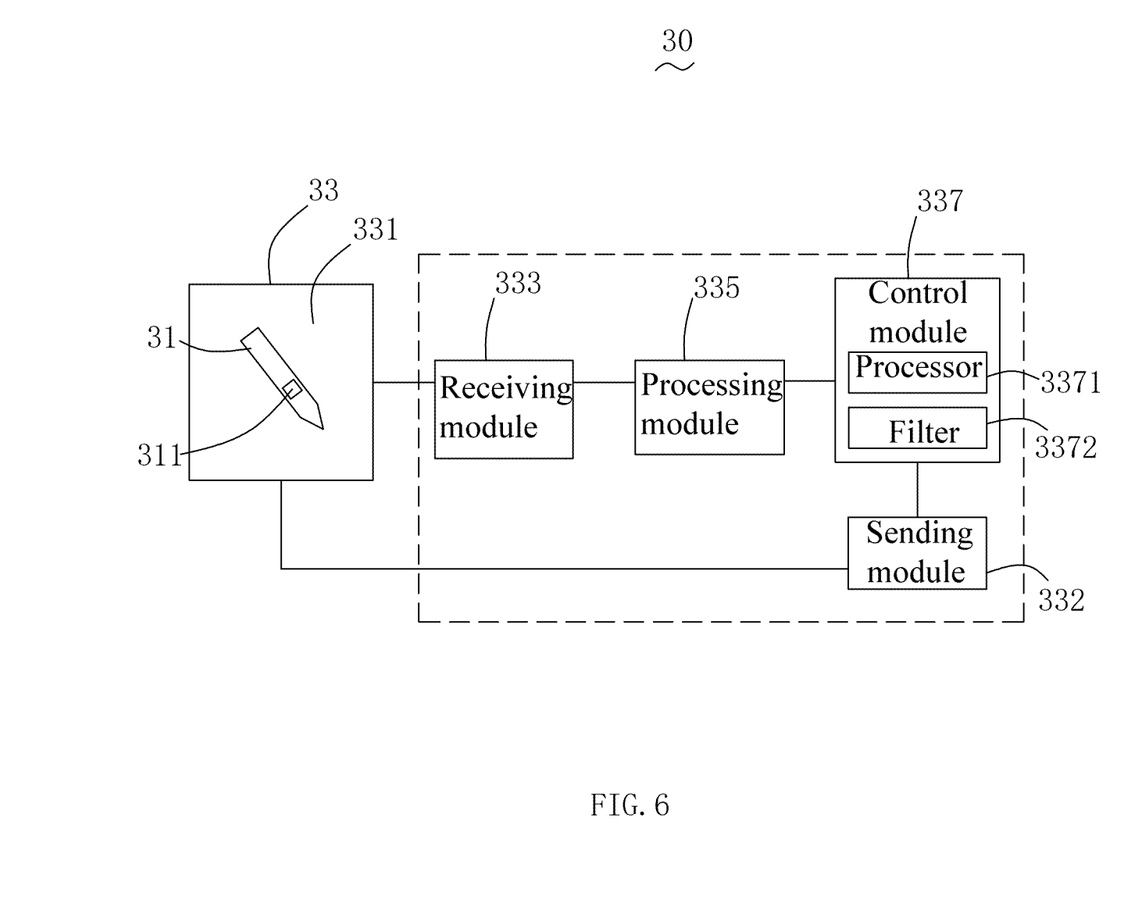
FIG. 6 is a schematic structural view of an electromagnetic handwriting system 30 according to a third embodiment of the present disclosure.
Figure 7:
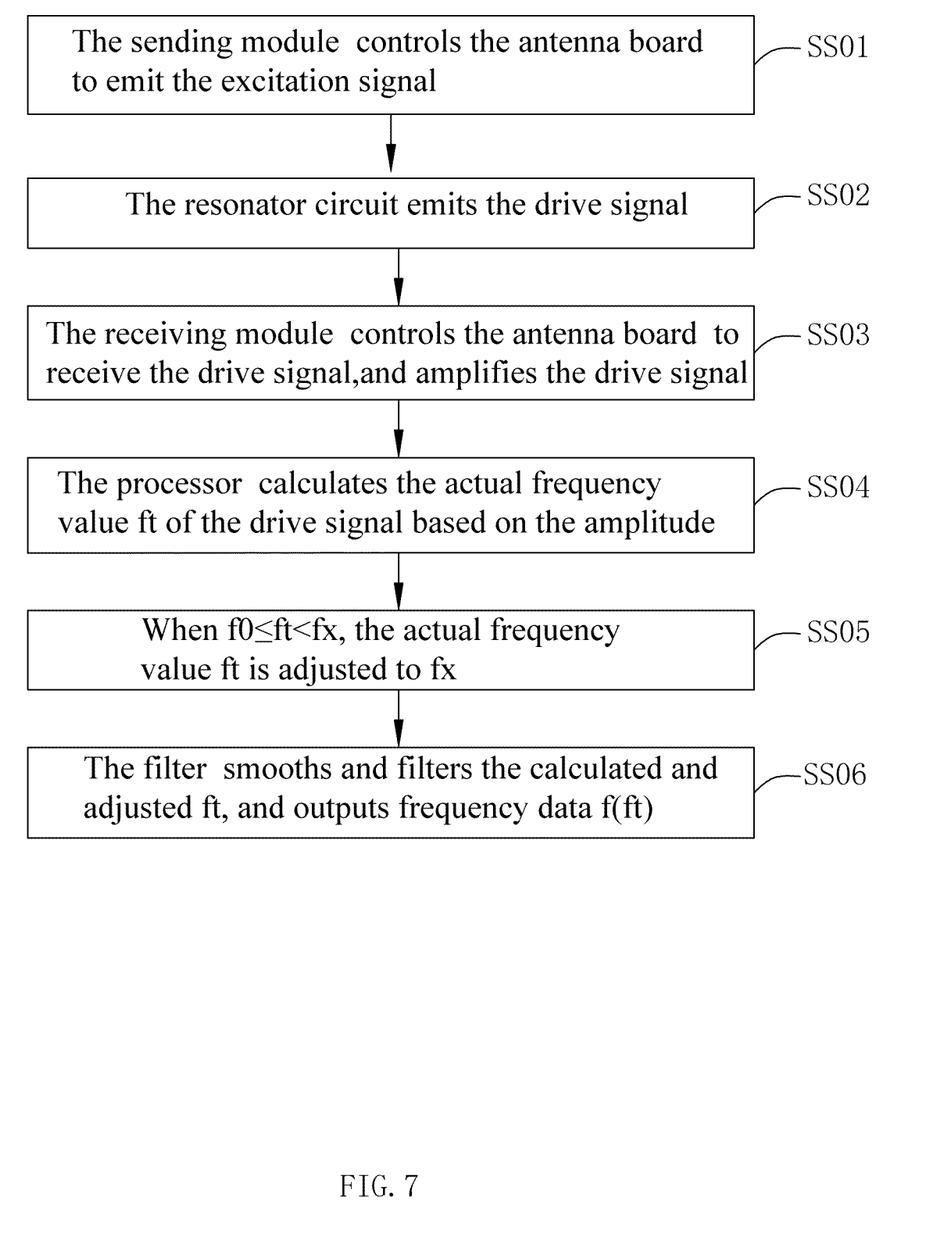
FIG. 7 is a flow block diagram of the electromagnetic handwriting system in FIG. 6.

Referring to FIG. 6 and FIG. 7, FIG. 6 is a schematic structural view of an electromagnetic handwriting system 30 according to a third embodiment of the present disclosure, and FIG. 7 is a flow block diagram of the electromagnetic handwriting system in FIG. 6. The electromagnetic handwriting system 30 includes an electromagnetic stylus 31 and an electromagnetic handwriting tablet 33. The electromagnetic handwriting tablet 33 emits an excitation signal. The electromagnetic stylus 31 receives the excitation signal and emits a drive signal. The drive signal drives the electromagnetic handwriting tablet 33 to be in a suspension state, an enable state, or a writing state.

In this embodiment, a frequency value at which the electromagnetic handwriting tablet 33 enters the suspension state is set as a suspension state frequency threshold f0, a frequency value at which the electromagnetic handwriting tablet 33 enters the enable state is set as an enable state frequency threshold f1, f1>f0, an actual frequency value of the drive signal received by the electromagnetic handwriting tablet 33 is set to ft, and the electromagnetic handwriting tablet 33 smooths and filters ft to output frequency data f(ft). In this case:

When f(ft)=f0, the electromagnetic handwriting tablet 33 is in the suspension state;

when f0<f(ft)<f1, the electromagnetic handwriting tablet 33 is in a state of switching between the suspension state and the enable state;

when f(ft)=f1, the electromagnetic handwriting tablet 33 is in the enable state; and when f(ft)>f1, the electromagnetic handwriting tablet 33 is in the writing state.

The electromagnetic stylus 31 includes a resonator circuit 311. The resonator circuit 311 receives the excitation signal, and then emits the drive signal according to the operating state of the electromagnetic stylus 31. The resonator circuit 311 includes an inductor and a capacitor. The inductor and the capacitor are electrically connected to each other. When the electromagnetic stylus 31 is being used, the actual frequency value ft of the drive signal is changed by changing an inductance coefficient of an inductor or a capacitance value of a capacitor.

The electromagnetic handwriting tablet 33 includes an antenna board 331, a sending module 332, a receiving module 333, a processing module 335, and a control module 337. The sending module 332 controls the antenna board 331 to emit the excitation signal. The receiving module 333 controls the antenna board 331 to receive the drive signal, and transmits the drive signal to the processing module 335. The processing module 335 outputs an amplitude of the drive signal, and transmits the amplitude to the control module 337. The control module 337 controls other modules to perform respective operations thereof. The control module 337 includes a processor 3371 and a filter 3372. The processor 3371 calculates the actual frequency value ft of the drive signal based on the amplitude. The filter 3372 smooths and filters ft.

When the electromagnetic handwriting system 30 operates:

In step SS01, under control of the control module 337, the sending module 332 controls the antenna board to emit an excitation signal.

In step SS02, the resonator circuit 311 receives the excitation signal, and emits the drive signal according to the operating state of the electromagnetic stylus 31.

In step SS03, under control of the control module 337, the receiving module 333 controls the antenna board 331 to receive the drive signal; and the receiving module 333 processes the drive signal, amplifies the drive signal, and transmits the drive signal to the processing module 335.

In step SS04, under control of the control module 337, the processing module 335 processes the drive signal, outputs an amplitude of the drive signal, and transmits the amplitude to the processor 3371.

In step SS05, the processor 3371 calculates the actual frequency value ft of the drive signal based on the amplitude. The virtual frequency value fx is set to satisfy f0<fx<f1. When f0≤ft<fx, the actual frequency value ft is adjusted to fx. The processor 3371 transmits the calculated and adjusted ft to the filter 3372.

In step SS06, the filter 3372 smooths and filters the calculated and adjusted ft, and outputs frequency data f(ft). When f(ft)=f1, the electromagnetic handwriting tablet enters the enable state.

Stylus receiving and leaving effects of the electromagnetic handwriting system 30 are the same as those of the electromagnetic handwriting system 10, which are not described herein any further.

Fourth Embodiment

Figure 8:
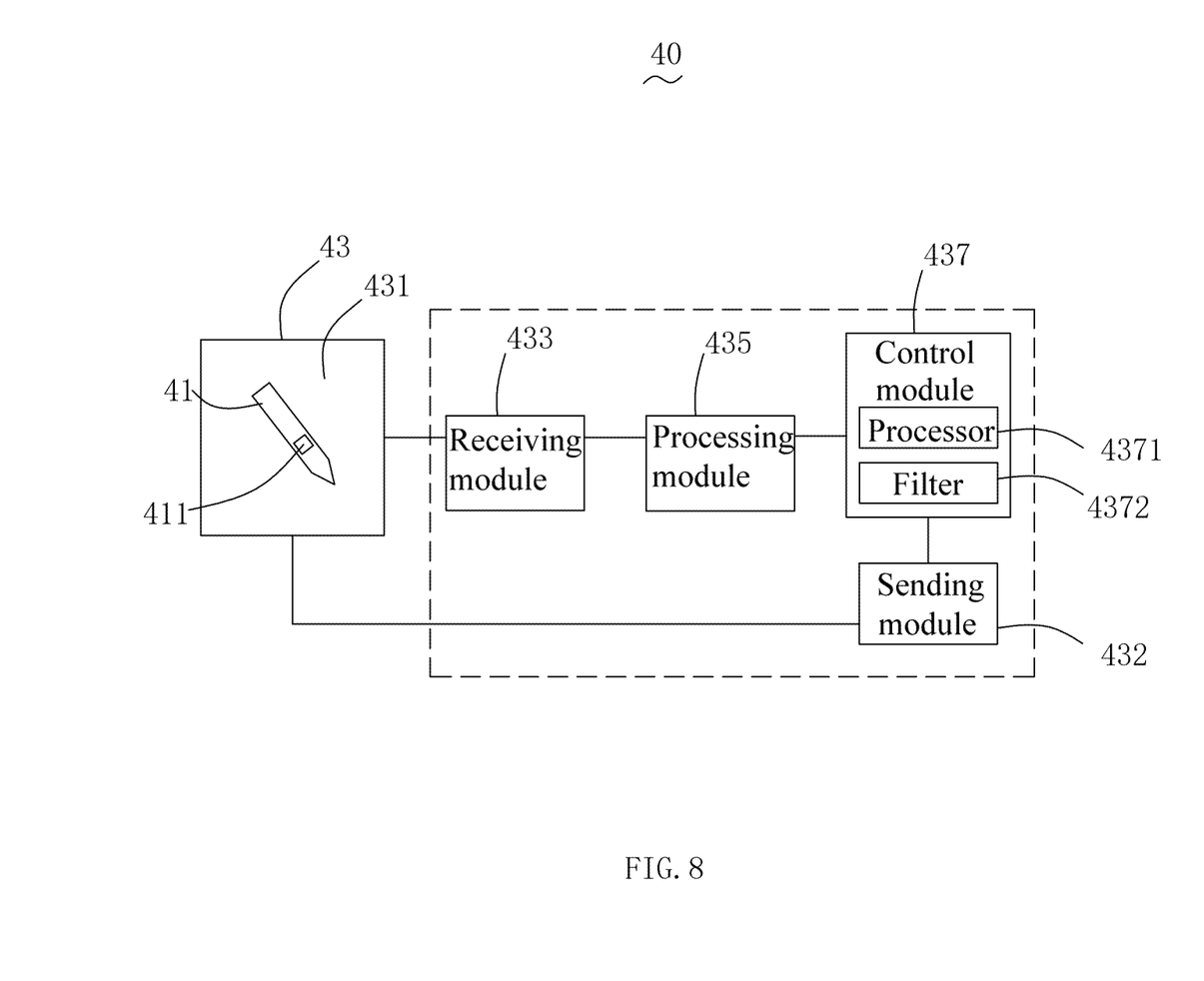
FIG. 8 is a schematic structural diagram of an electromagnetic handwriting system according to a fourth embodiment of the present disclosure is illustrated.

Referring to FIG. 8, a schematic structural diagram of an electromagnetic handwriting system according to a fourth embodiment of the present disclosure is illustrated. The electromagnetic handwriting system 40 includes an electromagnetic stylus 41 and an electromagnetic handwriting tablet 43. The electromagnetic handwriting tablet 43 emits an excitation signal. The electromagnetic stylus 41 receives the excitation signal and emits a drive signal. The drive signal drives the electromagnetic handwriting tablet 43 to be in a suspension state, an enable state, or a writing state.

In this embodiment, a frequency value at which the electromagnetic handwriting tablet 43 enters the suspension state is set as a suspension state frequency threshold f0, a frequency value at which the electromagnetic handwriting tablet 43 enters the enable state is set as an enable state frequency threshold f1, f1<f0, an actual frequency value of the drive signal received by the electromagnetic handwriting tablet 43 is set to ft, and the electromagnetic handwriting tablet 43 smooths and filters ft to output frequency data f(ft). In this case:

When f(ft)=f0, the electromagnetic handwriting tablet 43 is in the suspension state;

when f1<f(ft)<f0, the electromagnetic handwriting tablet 43 is in a state of switching between the suspension state and the enable state;

when f(ft)=f1, the electromagnetic handwriting tablet 43 is in the enable state; and when f(ft)<f1, the electromagnetic handwriting tablet 43 is in the writing state.

The electromagnetic stylus 41 includes a resonator circuit 411.

The electromagnetic handwriting tablet 43 includes an antenna board 431, a sending module 432, a receiving module 433, a processing module 435, and a control module 437. The control module 437 includes a processor 4371 and a filter 4372.

The operating principle of the electromagnetic handwriting system 40 is substantially the same as that of the electromagnetic handwriting system 30, and the only difference therebetween lies in that: The processor 4371 calculates the actual frequency value ft of the drive signal based on the amplitude; the virtual frequency value fx is set to satisfy f0>ft>f1; when f0>ft>fx, the actual frequency value ft is adjusted to fx; and the processor 4371 transmits the calculated and adjusted ft to the filter 4372.

Stylus receiving and leaving effects of the electromagnetic handwriting system 40 are the same as those of the electromagnetic handwriting system 20, which are not described herein any further.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An electromagnetic handwriting system, comprising:
an electromagnetic handwriting tablet configured to receive a drive signal, the drive signal driving the electromagnetic handwriting tablet to be in a suspension state or an enable state; wherein
a frequency value at which the electromagnetic handwriting tablet enters the suspension state is set as a suspension state frequency threshold f0;
a frequency value at which the electromagnetic handwriting tablet enters the enable state is set as an enable state frequency threshold f1; wherein
if an actual frequency value of the drive signal received by the electromagnetic handwriting tablet is set to ft, and a virtual frequency value fx is set to satisfy $|f0-f1|>|f0-fx|$ and $|f0-f1|>|fx-f1|$,
then when ft satisfies $|f0-fx|>|f0-ft|$ and $|f0-fx|>|ft-fx|$, ft is adjusted to fx in response to driving the electromagnetic handwriting tablet.

2. The system according to claim 1, wherein the suspension state frequency threshold f0 is less than the enable state frequency threshold f1, and the virtual frequency value fx satisfies $f0<fx<f1$.

3. The system according to claim 2, wherein when ft progressively increases from f0, the electromagnetic handwriting tablet is configured to smooth and filter the actual frequency value ft to output frequency data f(ft), wherein when $f0 \leq ft<fx$, ft is the virtual frequency value fx, and when $f(ft)=f1$, the electromagnetic handwriting tablet enters the enable state.

4. The system according to claim 2, wherein when ft progressively decreases to f0, the electromagnetic handwriting tablet is configured to smooth and filter the actual frequency value ft to output frequency data f(ft), wherein when $f0 \leq ft<fx$, ft is the virtual frequency value fx, and when $f(ft)=f1$, the electromagnetic handwriting tablet enters the enable state.

5. The system according to claim 1, wherein the suspension state frequency threshold f0 is greater than the enable state frequency threshold f1, and the virtual frequency value fx satisfies $f0>fx>f1$.

6. The system according to claim 5, wherein when ft progressively decreases from f0, the electromagnetic handwriting tablet is configured to smooth and filter the actual frequency value ft to output frequency data f(ft), wherein when $f0 \geq ft>fx$, ft is the virtual frequency value fx, and when $f(ft)=f1$, the electromagnetic handwriting tablet enters the enable state.

7. The system according to claim 5, wherein when ft progressively increases to f0, the electromagnetic handwriting tablet is configured to smooth and filter the actual frequency value ft to output frequency data f(ft), wherein when $f0 \geq ft>fx$, ft is the virtual frequency value fx, and when $f(ft)=f1$, the electromagnetic handwriting tablet enters the enable state.

8. An electromagnetic handwriting input method, comprising:
providing an electromagnetic handwriting tablet and receiving a drive signal, wherein the electromagnetic handwriting tablet comprises a suspension state and an enable state; and
setting a suspension state frequency threshold of the electromagnetic handwriting tablet to f0, and setting an enable state frequency threshold of the electromagnetic handwriting tablet to f1, wherein the electromagnetic handwriting tablet is configured to measure and calculate a frequency value ft of the drive signal, and if a virtual frequency value fx is set to satisfy $|f0-f1|>|f0-fx|$ and $|f0-f1|>|fx-f1|$, then when ft satisfies $|f0-fx|>|f0-ft|$ and $|f0-fx|>|ft-fx|$, the electromagnetic handwriting tablet is correspondingly driven to adjust ft to fx.

9. The method according to claim 8, wherein the suspension state frequency threshold f0 is less than the enable state frequency threshold f1, and the virtual frequency value fx satisfies $f0<fx<f1$.

10. The method according to claim 9, wherein when ft progressively increases from f0, the electromagnetic handwriting tablet is configured to smooth and filter the actual frequency value ft to output frequency data f(ft), wherein when $f0 \leq ft<fx$, ft is the virtual frequency value fx, and when $f(ft)=f1$, the electromagnetic handwriting tablet enters the enable state.

11. The method according to claim 9, wherein when ft progressively decreases to f0, the electromagnetic handwriting tablet is configured to smooth and filter the actual frequency value ft to output frequency data f(ft), wherein when $f0 \leq ft<fx$, ft is the virtual frequency value fx, and when $f(ft)=f1$, the electromagnetic handwriting tablet enters the enable state.

12. The method according to claim 8, wherein the suspension state frequency threshold f0 is greater than the enable state frequency threshold f1, and the virtual frequency value fx satisfies $f0>fx>f1$.

13. The method according to claim 12, wherein when ft progressively decreases from f0, the electromagnetic handwriting tablet is configured to smooth and filter the actual frequency value ft to output frequency data f(ft), wherein when $f0 \geq ft>fx$, ft is the virtual frequency value fx, and when $f(ft)=f1$, the electromagnetic handwriting tablet enters the enable state.

14. The method according to claim 12, wherein when ft progressively increases to f0, the electromagnetic handwriting tablet is configured to smooth and filter the actual frequency value ft to output frequency data f(ft), wherein when $f0 \geq ft>fx$, ft is the virtual frequency value fx, and when $f(ft)=f1$, the electromagnetic handwriting tablet enters the enable state.

* * * * *